US009195997B2

(12) United States Patent
Jevtic et al.

(10) Patent No.: US 9,195,997 B2
(45) Date of Patent: Nov. 24, 2015

(54) GENERATING CONTENT CAMPAIGN SNAPSHOTS

(71) Applicant: Google Inc., Mountain View, CA (US)

(72) Inventors: Nikola Jevtic, Marina del Rey, CA (US); Zhaosheng (Josh) Bao, Mountain View, CA (US); William David Reardon, Santa Monica, CA (US); Max David Cohen, Marina del Rey, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/152,228

(22) Filed: Jan. 10, 2014

(65) Prior Publication Data
US 2015/0199731 A1 Jul. 16, 2015

(51) Int. Cl.
G06Q 30/00 (2012.01)
G06Q 30/02 (2012.01)

(52) U.S. Cl.
CPC ........ *G06Q 30/0277* (2013.01); *G06Q 30/0243* (2013.01)

(58) Field of Classification Search
CPC .................................................. G06Q 30/0243
See application file for complete search history.

(56) References Cited

U.S. PATENT DOCUMENTS

| 8,250,527 | B1* | 8/2012 | Gubbay et al. ................. 717/113 |
| 2005/0210380 | A1 | 9/2005 | Kramer et al. |
| 2006/0111971 | A1 | 5/2006 | Salesin et al. |
| 2008/0052140 | A1* | 2/2008 | Neal et al. .......................... 705/7 |
| 2008/0243571 | A1 | 10/2008 | Edelman |
| 2008/0244391 | A1 | 10/2008 | Menachem et al. |
| 2009/0316199 | A1* | 12/2009 | Yoshimura et al. ........... 358/1.15 |
| 2012/0110615 | A1 | 5/2012 | Kilar et al. |
| 2012/0179557 | A1* | 7/2012 | Gross ......................... 705/14.73 |
| 2012/0221386 | A1 | 8/2012 | Netzer et al. |
| 2012/0232957 | A1 | 9/2012 | Hahn et al. |

FOREIGN PATENT DOCUMENTS

| KR | 10-2013-0047846 A | 5/2013 |
| WO | WO-2006/130824 | 12/2006 |

OTHER PUBLICATIONS

International Search Report and Written Opinion mailed Oct. 20, 2014 in PCT Application No. PCT/US2014/014412 (10 pages).

\* cited by examiner

*Primary Examiner* — John G Weiss
*Assistant Examiner* — Scott C Anderson
(74) *Attorney, Agent, or Firm* — Foley & Lardner LLP; John D. Lanza

(57) ABSTRACT

Systems, methods, and computer-readable storage media that may be used to generate representative sample images for content campaigns are provided. One method includes identifying a resource in which a content campaign item has been previously displayed. The method further includes determining a content slot within the resource in which the content campaign item was previously displayed. The content slot is determined based on a slot signature associated with the content slot. The method further includes retrieving a current version of the resource, where the current version of the resource includes a current content item appearing in the content slot. The method further includes generating a representative image of the resource that includes the content campaign item by replacing the current content item appearing in the content slot within the current version of the resource with the content campaign item.

20 Claims, 9 Drawing Sheets

600 →

Campaign A　　　　　　　　　　　　　　　610
　　　　　　　　　　　　　　See Placement Snapshots

| | Placement | Group | Max CPM | CTR | Avg. CFC | Avg. CPM | Cost |
|---|---|---|---|---|---|---|---|
| 605 — ☐ | URL 1 | X | $0.25 | 0.00% | $0.00 | $0.25 | $0.01 |
| 605 — ☐ | URL 2 | X | $0.25 | 0.00% | $0.00 | $0.25 | $0.00 |
| 605 — ☐ | URL 3 | X | $0.25 | 3.85% | $0.01 | $0.25 | $0.01 |
| 605 — ☐ | URL 4 | X | $0.25 | 0.00% | $0.00 | $0.25 | $0.00 |

FIG. 6

GENERATING CONTENT CAMPAIGN SNAPSHOTS

BACKGROUND

Content providers often like to see images of their content in the context of the resources (e.g., webpages) in which they appear, to get an idea of how their content appears to the end-user. In print media, content providers know exactly where the campaign items will appear, so they can simply obtain a copy of the printed material including the campaign items.

It is more difficult for a content provider to obtain such snapshots for electronic content campaigns facilitated by a content management system, because content items are typically selected dynamically, and do not appear in a predictable manner within a particular resource. To generate snapshots for electronic content campaigns, content providers (e.g., entities marketing their own products/services and/or marketing agents representing such entities) would simply navigate a browser program to a website on which their content appears and spend hours clicking the refresh button, hoping that the right content item would appear. This is very cumbersome, particularly because input used in the selection of content items to display (e.g., geographic, user interest, etc.) may affect a likelihood that content providers will be served particular content items.

SUMMARY

One illustrative implementation of the disclosure relates to a method that includes identifying, at a computerized content management system, a resource in which a content campaign item has been previously displayed. The method further includes determining, using the content management system, a content slot within the resource in which the content campaign item was previously displayed. The content slot is determined based on a slot signature associated with the content slot. The method further includes retrieving, using the content management system, a current version of the resource, where the current version of the resource includes a current content item appearing in the content slot. The method further includes generating a representative image of the resource that includes the content campaign item by replacing, using the content management system, the current content item appearing in the content slot within the current version of the resource with the content campaign item.

Another implementation relates to a system that includes at least one computing device operably coupled to at least one memory and configured to identify a resource in which a content campaign item has been previously displayed. The at least one computing device is further configured to determine a content slot within the resource in which the content campaign item was previously displayed. The content slot is determined based on a slot signature associated with the content slot. The at least one computing device is further configured to retrieve a current version of the resource, where the current version of the resource includes a current content item appearing in the content slot. The at least one computing device is further configured to generate a representative image of the resource that includes the content campaign item by replacing the current content item appearing in the content slot within the current version of the resource with the content campaign item.

Yet another implementation relates to one or more computer-readable storage media having instructions stored thereon that, when executed by at least one processor, cause the at least one processor to perform operations. The operations include identifying a resource in which a content campaign item has been previously displayed. The operations further include identifying one or more candidate content slots within the resource. The operations further include determining a content slot in which the content campaign item previously appeared from among the one or more candidate content slots based on a slot signature. The slot signature is based on at least one characteristic of the content slot and at least one characteristic of the content campaign item. The operations further include retrieving a current version of the resource, where the current version of the resource includes a current content item appearing in the content slot. The operations further include generating a representative image of the resource that includes the content campaign item by replacing, using the content management system, the current content item appearing in the content slot within the current version of the resource with the content campaign item. The operations further include verifying that the content campaign item appears correctly within the representative image by comparing a portion of the representative image in which the content campaign item should appear with a stored image of the content campaign item.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

FIG. 6 is an illustration of a user interface presenting information regarding a content campaign to a user according to an illustrative implementation.

DETAILED DESCRIPTION

Figure 1:
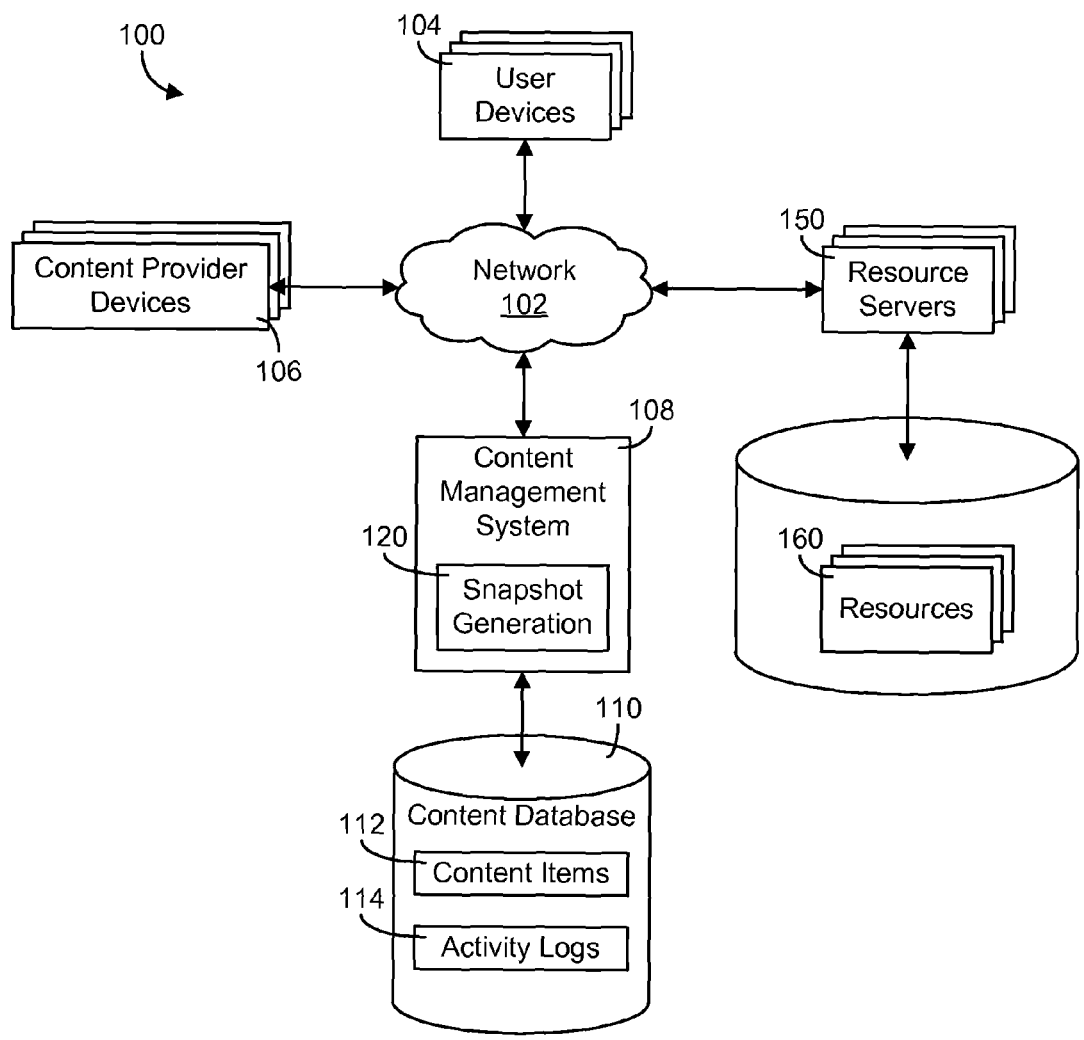
FIG. 1 is a block diagram of a content management system and associated environment according to an illustrative implementation.

Referring generally to the Figures, various illustrative systems and methods are provided that may be used to generate illustrative representative images (e.g., snapshots) of content campaign items in the context of the resources in which they have appeared. A content management system may identify a webpage or other resource in which a content item from a content campaign has appeared. The system may determine a candidate content slot in the webpage in which the content item may have appeared. In some implementations, the candidate content slot may be determined by matching a size of the content item to a size of the content slot in the webpage.

Once a candidate content slot has been identified, the system may verify that the content item actually had been served in that particular slot. In some implementations, each time an impression of the content item is served, a content slot signature may be computed and saved to a log file. The content slot signature may identify the particular content slot within a webpage or other resource in which the impression of the content item was displayed. The content management system may retrieve the content slot signatures for all impressions of the content item and determine whether any of the content slot signatures matches a signature for the selected candidate content slot. If any of the content slot signatures match, there is a high likelihood that the content item was previously served in the candidate content slot, and the candidate content slot is approved for the snapshot.

The content management system swaps a current content item in the webpage or other resource with a rendering of the desired content campaign item. The system may swap the content item by injecting a portion of code into a code associated with the resource, run code as a browser extension, or in some other manner. Once the desired content campaign item has been swapped into the appropriate content slot within the resource, the campaign snapshot has been generated. In some implementations, other content items appearing in other content slots on the page may be replaced with blank slots or otherwise modified to avoid drawing attention away from the desired content item.

In some implementations, the content management system may verify that the snapshot has been generated correctly. The snapshot may have an error in it (e.g., the desired content item may not be visible) due to a variety of reasons, such as timing issues with the rendering, overlay problems with the source page, and/or other reasons. To verify that the content item was successfully swapped and is visible in the generated snapshot, the content management system may extract the coordinates where the content item is expected to appear from the browser while rendering the page. The system may use the coordinates to compare the image in that part of the generated snapshot with an image of the desired content item (e.g., using a pixel-by-pixel comparison). If the desired content item matches the image at the compared portion of the generated snapshot, the snapshot was rendered correctly.

Referring now to FIG. 1, and in brief overview, a block diagram of a content management system 108 and associated environment 100 is shown according to an illustrative implementation. One or more user devices 104 may be used by a user to perform various actions and/or access various types of content, some of which may be provided over a network 102 (e.g., the Internet, LAN, WAN, etc.). For example, user devices 104 may be used to access websites (e.g., using an internet browser), media files, and/or any other types of content. A content management system 108 may be configured to select content for display to users within resources (e.g., webpages, applications, etc.) and to provide content items 112 from a content database 110 to user devices 104 over network 102 for display within the resources. The content from which content management system 108 selects items may be provided by one or more content providers via network 102 using one or more content provider devices 106.

In some implementations, bids for content to be selected by content management system 108 may be provided to content management system 108 from content providers participating in an auction using devices, such as content provider devices 106, configured to communicate with content management system 108 through network 102. In such implementations, content management system 108 may determine content to be published in one or more content interfaces of resources (e.g., webpages, applications, etc.) shown on user devices 104 based at least in part on the bids.

Content management system 108 may be configured to generate representative snapshots of resources including content items from a content campaign. Content management system 108 may retrieve a current version of a resource in which a content item of the content campaign was previously displayed and determine a content slot within the resource in which the content item was displayed. System 108 may swap a content item that is in the retrieved current version of the resource with the desired content item for the snapshot. In some implementations, system 108 may perform a verification procedure to confirm that the swapped-in content item has been rendered correctly in the final generated snapshot. The snapshot may be provided to the content provider as an approximate visual representation of what users are seeing when presented with the content item within the resource.

Referring still to FIG. 1, and in greater detail, user devices 104 and/or content provider devices 106 may be any type of computing device (e.g., having a processor and memory or other type of computer-readable storage medium), such as a television and/or set-top box, mobile communication device (e.g., cellular telephone, smartphone, etc.), computer and/or media device (desktop computer, laptop or notebook computer, netbook computer, tablet device, gaming system, etc.), or any other type of computing device. In some implementations, one or more user devices 104 may be set-top boxes or other devices for use with a television set. In some implementations, content may be provided via a web-based application and/or an application resident on a user device 104. In some implementations, user devices 104 and/or content provider devices 106 may be designed to use various types of software and/or operating systems. In various illustrative implementations, user devices 104 and/or content provider devices 106 may be equipped with and/or associated with one or more user input devices (e.g., keyboard, mouse, remote control, touchscreen, etc.) and/or one or more display devices (e.g., television, monitor, CRT, plasma, LCD, LED, touchscreen, etc.).

User devices 104 and/or content provider devices 106 may be configured to receive data from various sources using a network 102. In some implementations, network 102 may comprise a computing network (e.g., LAN, WAN, Internet, etc.) to which user devices 104 and/or content provider device 106 may be connected via any type of network connection (e.g., wired, such as Ethernet, phone line, power line, etc., or wireless, such as WiFi, WiMAX, 3G, 4G, satellite, etc.). In some implementations, network 102 may include a media distribution network, such as cable (e.g., coaxial metal cable), satellite, fiber optic, etc., configured to distribute media programming and/or data content.

Content management system 108 may be configured to conduct a content auction among third-party content providers to determine which third-party content is to be provided to a user device 104. For example, content management system 108 may conduct a real-time content auction in response to a user device 104 requesting first-party content from a content source (e.g., a website, search engine provider, etc.) or executing a first-party application. Content management system 108 may use any number of factors to determine the winner of the auction. For example, the winner of a content auction may be based in part on the third-party content provider's bid and/or a quality score for the third-party provider's content (e.g., a measure of how likely the user of the user device 104 is to click on the content). In other words, the highest bidder is not necessarily the winner of a content auction conducted by content management system 108, in some implementations.

Content management system 108 may be configured to allow third-party content providers to create campaigns to control how and when the provider participates in content auctions. A campaign may include any number of bid-related parameters, such as a minimum bid amount, a maximum bid amount, a target bid amount, or one or more budget amounts (e.g., a daily budget, a weekly budget, a total budget, etc.). In some cases, a bid amount may correspond to the amount the third-party provider is willing to pay in exchange for their content being presented at user devices 104. In some implementations, the bid amount may be on a cost per impression or cost per thousand impressions (CPM) basis. In further implementations, a bid amount may correspond to a specified action being performed in response to the third-party content being presented at a user device 104. For example, a bid amount may be a monetary amount that the third-party content provider is willing to pay, should their content be clicked on at the client device, thereby redirecting the client device to the provider's webpage or another resource associated with the content provider. In other words, a bid amount may be a cost per click (CPC) bid amount. In another example, the bid amount may correspond to an action being performed on the third-party provider's website, such as the user of user device 104 making a purchase. Such bids are typically referred to as being on a cost per acquisition (CPA) or cost per conversion basis.

A campaign created via content management system 108 may also include selection parameters that control when a bid is placed on behalf of a third-party content provider in a content auction. If the third-party content is to be presented in conjunction with search results from a search engine, for example, the selection parameters may include one or more sets of search keywords. For instance, the third-party content provider may only participate in content auctions in which a search query for "golf resorts in California" is sent to a search engine. Other example parameters that control when a bid is placed on behalf of a third-party content provider may include, but are not limited to, a topic identified using a device identifier's history data (e.g., based on webpages visited by the device identifier), the topic of a webpage or other first-party content with which the third-party content is to be presented, a geographic location of the client device that will be presenting the content, or a geographic location specified as part of a search query. In some cases, a selection parameter may designate a specific webpage, website, or group of websites with which the third-party content is to be presented. For example, an advertiser selling golf equipment may specify that they wish to place an advertisement on the sports page of a particular online newspaper.

Content management system 108 may also be configured to suggest a bid amount to a third-party content provider when a campaign is created or modified. In some implementations, the suggested bid amount may be based on aggregate bid amounts from the third-party content provider's peers (e.g., other third-party content providers that use the same or similar selection parameters as part of their campaigns). For example, a third-party content provider that wishes to place an advertisement on the sports page of an online newspaper may be shown an average bid amount used by other advertisers on the same page. The suggested bid amount may facilitate the creation of bid amounts across different types of client devices, in some cases. In some implementations, the suggested bid amount may be sent to a third-party content provider as a suggested bid adjustment value. Such an adjustment value may be a suggested modification to an existing bid amount for one type of device, to enter a bid amount for another type of device as part of the same campaign. For example, content management system 108 may suggest that a third-party content provider increase or decrease their bid amount for desktop devices by a certain percentage, to create a bid amount for mobile devices.

Content management system 108 may include a snapshot generation module 120 configured to generate representative images showing how content items of a content campaign may have appeared within resources in which they have previously been presented. Snapshot generation module 120 may identify one or more content items 112 of a content campaign for which snapshots are to be generated. Content items 112 may be stored within content database 110. Module 120 may identify one or more resources 160 (e.g., webpages, applications, etc.) in which a desired content item for which a snapshot is to be generated has previously appeared. For example, module 120 may examine activity logs 114 in which records of instances in which the content item was selected for display to a user are stored. Based on the records, module 120 may identify at least one resource in which the content item was previously presented. Module 120 may retrieve a current copy of the resource from a respective resource server 150 that is configured to serve copies of the resource to external devices upon request. Module 120 may identify a content slot in which the content item was previously presented, for example, based on a content slot signature associated with the relevant record in activity logs 114. Module 120 may exchange a current content item in the content slot of the retrieved current copy for an image of the desired campaign content item. In some implementations, module 120 may verify that the campaign content item image has been rendered properly within the representative snapshot of the resource before providing the snapshot image to the content provider.

In some implementations, snapshot generation module 120 may be configured to conduct an offline process for generating snapshots. In such implementations, snapshot generation module 120 may identify one or more campaigns and/or content items for which snapshots are to be generated and generate one or more snapshots (e.g., several snapshots for each campaign) in an automated fashion, such that the snapshots are available to provide to the content provider without having to first receive a request from the content provider and then process the snapshots on-demand. Instead of swapping content items within a resource online, such as within a browser on the content provider device, the content item may be swapped using an offline process configured to identify the components of the resource, swap the content items, generate the snapshot, and store the snapshot for later presentation to the user (e.g., within a campaign reporting interface).

Figure 2:
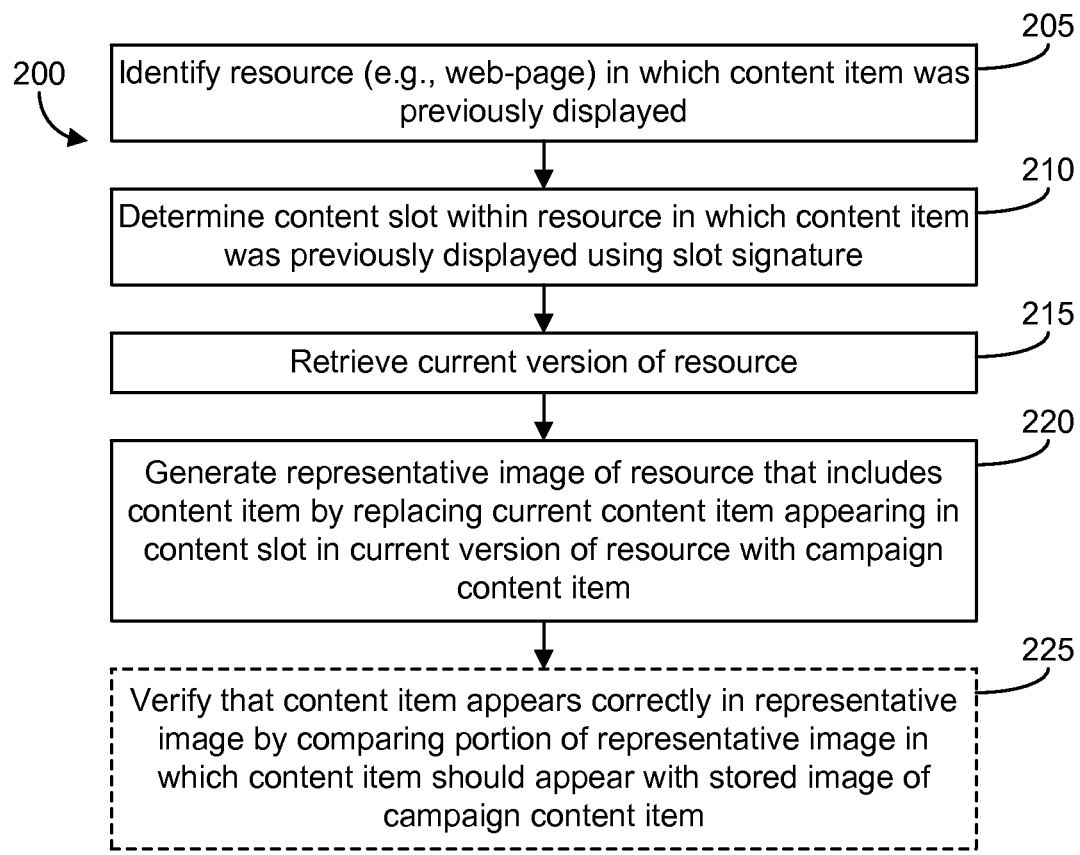
FIG. 2 is a flow diagram of a process for generating a representative image (e.g., snapshot) of a content item in the context of a resource in which the content item previously appeared according to an illustrative implementation.

FIG. 2 illustrates a flow diagram of a process 200 for providing snapshots of content campaign items according to an illustrative implementation. Referring to both FIGS. 1 and 2, content management system 108 may be configured to generate snapshots of a content campaign item in the context of a resource in which it appeared. The snapshots may be presented for display on a content provider device 106. The content campaign items may include informational displays, banners, images, advertisements, creative elements, artistic renderings, text, icons, video, drawings, etc.

Content management system 108 may be configured to identify at least one of resources 160 in which a content campaign item 112 was previously displayed (205). A resource 160 may include any space within the resource in which a content campaign item may be displayed. For example, a resource 160 may be a webpage, an application (e.g., an app configured for execution on a mobile device), or any other type of interface through which information may be presented to users. In some implementations, the desired resource 160 may be manually identified by the content provider. For example, the content provider may be aware of a particular webpage in which the content provider knows the content campaign item 112 has been displayed, and the content provider may provide user input identifying the webpage (e.g., by a uniform resource locator, or URL, of the webpage). In some implementations, the content provider may be presented with a list of one or more resources 160 in which the content campaign item 112 has previously been displayed (e.g., a list of top resources 160 by number/percentage of impressions), and the content provider may select one or more of the identified resources 160 as targets for the generation of campaign snapshots. In some implementations, a resource 160 may be identified automatically by content management system 108. For example, in some implementations, system 108 may automatically identify one or more top resources (e.g., resources associated with a greatest number/percentage of impressions/clicks of the content campaign and/or a particular content item, resources associated with a number/percentage of impressions/clicks exceeding a threshold value, etc.) and generate snapshots for each of the top resources. In various implementations, content management system 108 may automatically select resources 160 based upon various input metrics, such as page rank, number of impressions/clicks, click through rates, average impression cost, etc. Any number or combination of the input metrics described above may be used to partially or completely automatically identify and select a resource 160 in which a content campaign item 112 was previously displayed.

In various implementations, the content campaign item 112 to be included within the campaign snapshot may be specifically chosen by the content provider or it may be chosen through an automated operation of system 108. For example, system 108 may provide a content provider with campaign reports listing one or more campaigns and/or content items, and the content provider may manually select one or more campaigns and/or content campaign items for snapshot generation (on-demand or offline). In some implementations, the content provider may additionally or alternatively manually select a resource 160 to be included in the snapshot, such as by entering or selecting a resource locator, such as a URL for a webpage, into a content provider interface provided by system 108 on a content provider device 106. In some implementations, the campaign content item 112 and/or resource 160 to be included in the snapshot may be automatically selected by system 108. For example, system 108 may select one or more campaign content items of greatest importance to a campaign (e.g., having a greatest number of impressions/clicks) and/or one or more resources in which impressions of the campaign content items appeared a greatest number of times.

The system may determine a content slot within the selected resource 160 in which the content campaign item 112 was previously displayed using a content slot signature (210). Identifying a content slot within a resource 160 in which the content campaign item 112 previously appeared allows system 108 to place an image of the content campaign item 112 in the same general position in which the previously displayed impression was shown, which may provide a representation that is similar to what was previously displayed to a user. A content slot may refer to a dedicated space within the resource 160 in which selected content items (e.g., selected via an auction process conducted by system 108) are displayed. Where the resource 160 is a webpage, for example, the content slot may be any portion of the webpage designated (e.g., within an underlying code of the webpage, such as HTML code) for the display of one or more content items. Content items may be placed in a variety of spaces on webpages, including on top of the webpage, in a banner, on a side of the webpage, above or below the fold of the webpage, etc. Above the fold may refer to the part of a webpage that is first visible upon rendering of a webpage without scrolling under certain common browser/display settings (e.g., common display resolutions).

The content slots at different locations of a webpage as described above may have varying parameters, such as different sizes, shapes, or content requirements. As a result, a content campaign item 112 suitable for placement at one location may not be suitable at another location. In some cases, a content provider may desire to place its content items at specific locations (e.g., locations having particular characteristics, such as locations above the fold) and may be willing to bid more for those locations. The varying parameters of the content slots (e.g., size of the content slots, such as height and width) may allow the slots to be readily identified and/or distinguished from one another and/or from other portions of the resource 160. In some implementations, the content slots may be embedded into the overall structure of the resource (e.g., source page), and to uniquely identify the content slots, both content slot parameters and resource parameters (e.g., where the content slot is located within the enclosing structure) may be used to uniquely identify the content slot.

In some implementations, the content management system 108 may be configured to receive and execute one or more scripts (e.g., a Javascript script) to obtain parameters of the content slot and/or the resource 160 in which the content slot appears. Based on the parameters of the content slot and the resource 160, a unique identifier of the content slot may be generated. The unique identifier may serve as a slot signature to identify a particular content slot within a resource 160. The slot signature may be associated with an identifier of the resource 160, for example, a URL identifier of a webpage. The slot signature may be computed by the script when the request to serve the content item is initially made, and the slot signature may be logged and stored into a database. In some implementations, the slot signature may be stored within activity logs 114 (e.g., each record of an impression of the campaign content item stored in activity logs 114 may have associated therewith a slot signature indicative of the content slot in which the impression was served). The slot signature may be a mostly stable identifier that may be matched as long as changes in the structure of the resource from the time a content item was previously served are not substantial.

In some illustrative implementations, content management system 108 may obtain a script that is configured to identify a content slot on a webpage. The script may be provided by content management system 108 to a user device or a resource server after content management system 108 selects a content item to be displayed on the user device within a content slot of a resource. The script can be executed on the user device 104 and/or content management system 108 to obtain parameters of the content and resource (e.g., webpage) parameters of the content slot. In some implementations, the script may be transmitted from content management system 108 to the user device and configured to execute at the user device (e.g., in a web browser) to obtain the content parameters and the resource parameters. In other implementations, content management system 108 may be configured to receive a resource (e.g., source page) from a resource server 150 (e.g., through a crawling procedure) and modify the resource to include the script that provides for content swapping. This may avoid the need to obtain user approval on the user device to execute an extension (e.g., browser extension). In various implementations, the content parameters can include, for example, at least one of a content width, a content height, a content type, a content format, and a content slot name. The resource parameters may include, for example, identifiers of parent nodes of the content slot in a hierarchical structure of the resource.

In some implementations, a slot signature may be generated that may be or include a unique identifier based on the content parameters and/or resource parameters. The generated unique identifier may be associated with an identifier of the resource (e.g., a URL identifier of the webpage). In various implementations, the unique identifier can be generated at the user device or the resource server when the script is executed. In such implementations, the unique identifier may then be received by content management system 108 for further processing and/or storage. In other implementations, the unique identifier may be generated at content management system 108 after content management system 108 receives the content parameters and/or the resource parameters. In one implementation, the unique identifier may be generated by using a hash function. For example, in one implementation, the unique identifier may be generated by concatenating one or more of the content parameters into a first string and concatenating one or more of the resource parameters into a second string, combining the first string and the second string into a combined string, and inputting the combined string into the hash function.

In some implementations, content management system 108 may be configured to obtain and analyze historical content slot data. For example, content management system 108 may be configured to query and/or otherwise inspect the contents of data in a database (e.g., activity logs 114 stored in content database 110) for the existence of relevant historical content slot data by searching for a match between a slot signature and a historical slot signature. The historical slot signature may be associated with the identifier of the resource (e.g., the URL identifier of the webpage). If a match is determined, this may indicate that an impression of a content item associated with the matching historical slot signature in the stored data may have been previously served within the content slot in the resource. If a match is not found, this may indicate that the historical data does not reflect a content item impression having previously been served in the content slot.

Figure 3:
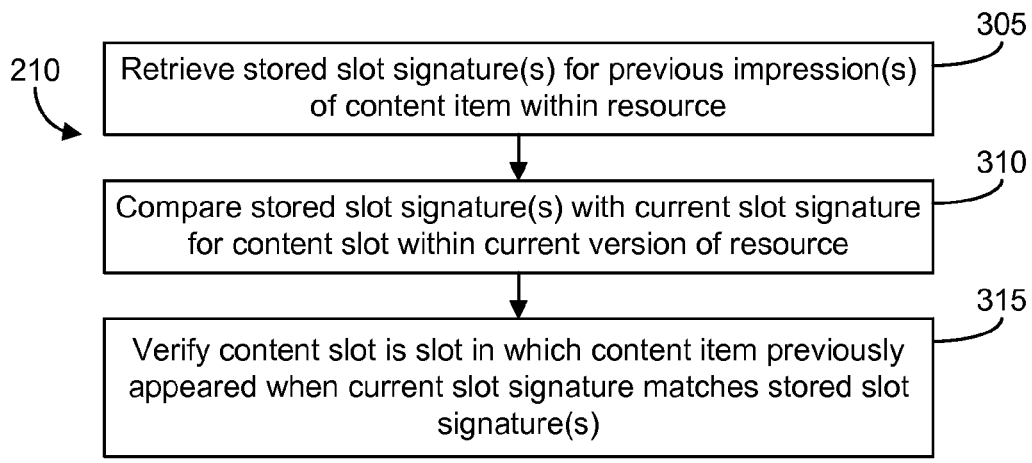
FIG. 3 is a flow diagram of a process for verifying that a content slot of a resource is the content slot in which the content item previously appeared according to an illustrative implementation.

FIG. 3 illustrates a process for determining the content slot in which the content item was previously displayed based on the slot signature according to an illustrative implementation. In some implementations, the process illustrated in FIG. 3 may be utilized by content management system 108 in performing operation 210 of process 200.

In some implementations, system 108 may retrieve one or more stored or historical slot signatures for previous impressions of the content item within the resource (305). The slot signatures may be logged and stored in a database, such as within activity logs 114 in content database 110, which may be configured to receive and store records of served content item impressions and associated slot signatures for later retrieval by content management system 108. To retrieve the stored slot signatures for previous impressions, content management system 108 may query the database for any records associated with the content item and resource for which the snapshot is to be generated. The database may return slot signatures associated with any records having fields with identifiers matching the content item and resource.

Content management system 108 may compare the retrieved stored slot signatures with current slot signature(s) of content slot within a current version of the resource to determine the content slot of the resource in which the content item was previously displayed (310). In some implementations, a current slot signature may be determined for one or more content slots in the current version of the resource based on characteristics of the content slot, the resource, and/or the content item, alone or in combination with one another. Resources may change over time, and the current format of a resource may be different from a version of the resource in which the content campaign item previously appeared (e.g., a content slot in which the item previously appeared may no longer be present in the resource, may have moved, may have changed sizes, etc.). Comparing slot signatures may help ensure that the characteristics of the content slot and/or the resource have not changed too substantially since the time at which the content item was previously served. For example, slot signatures may be determined based in part on the characteristics of the content slot and/or the resource (e.g., dimensions of the content slot, position of the content slot within the resource, etc.), and, if the characteristics have changed substantially, the slot signatures may not match.

In some implementations, system 108 may verify that a particular content slot within the current version of the resource is the slot in which a content campaign item previously appeared (315). The verification may be based on the comparison in operation 310. For example, if the current slot signature matches one of the stored slot signatures for the content item and the resource, system 108 may determine that the content slot is a slot in which an impression of the item was previously provided to a user. If the current slot signature does not match one of the stored slot signatures for the content item and the resource, system 108 may determine that the content slot is not a slot in which an impression of the item was previously provided to the user. In some implementations, system 108 may require that the entire current slot signature (e.g., all of various characteristics used to create the slot signature) match a stored slot signature to verify a content slot. For example, system 108 may require an exact match in slot signature hashtags. In some implementations, system 108 may require only a partial match in characteristics of the slot signatures. For example, a content slot may be verified if certain characteristics of the slot signatures match (e.g., a position of the content slot within the resource, etc.) and other characteristics do not match (e.g., if the slot dimensions are not identical, but are within a threshold of the dimensions reflected in a stored slot signature).

By verifying the content slot, system 108 may increase the likelihood that the content item is placed in a similar location within the generated snapshot to a location in which it originally appeared in the impression previously presented to a user. Thus, the verification process may help improve the likelihood that the final snapshot is a realistic representation of the campaign impressions being generated by system 108. In some implementations, verification based on slot signatures may also help predict whether the identified content slot will result in a snapshot with the content item above the fold or even viewable (e.g., when the slot signature is at least partially indicative of an absolute or relative position of the content slot). In some implementations, system 108 may take particular actions depending on the location of the content slot. For example, system 108 may zoom in on the content item in the rendered snapshot if the content item appears in a slot below the fold. In some implementations, the slot signatures may be computed for real-time or on-demand requests (e.g., from a content provider requesting a snapshot from system 108) using a script operated on the content provider device, the resource server, and/or system 108 (e.g., within a browser application, such as a browser plugin). In some implementations, the slot signatures may be computed for backfill requests using a script or program executed on system 108 or an associated external system. In some such implementations, backfill requests may be addressed with a reduced number of parameters. In one implementation, backfilled content requests may only use particular parameters, such as slot name and dimensions for computing a slot signature. The signatures may then be logged with a request protocol, and the observed signatures may later be extracted from the logs for desired placements in snapshots.

Referring again to FIGS. 1 and 2, content management system 108 may retrieve a current version of the resource 160 (215). In one implementation, a current version of a resource 160 may be obtained following the determination that a target campaign content item 112 previously appeared in an identified content slot within the resource 160. The current versions of the resource 160 may be retrieved by transmitting a request (e.g., an HTTP request) to the resource server 150 that hosts the resource 160 through network 102, in response to which the resource server 150 returns a current copy of the resource 160 (e.g., an HTML-encoded webpage) to system 108.

Content management system 108 generates a representative image of the resource 160 that includes the desired content campaign item 112 (220). Content management system 108 may generate the representative image by replacing, or swapping, a current content item appearing in the identified content slot in the current version of the resource 160 with the desired content campaign item 112. In some implementations, a web crawling application may be used to crawl the resource 160 to determine the contents and structure of the resource 160. System 108 may be configured to crawl the resource 160 itself or may be configured to obtain a crawled version of the resource from an external system (e.g., a webpage indexing system). System 108 may insert a script or code portion into the crawled resource 160 configured to swap a content item currently in the target content slot with the desired campaign content item 112. In some implementations, the script may identify the target content slot from which the current item is to be swapped with the desired campaign content item 112 based on a size of the content slot and/or current item. For example, resources 160 may have standardized sizes for particular types of content items (e.g., designated marketing content items), and if a content slot of a particular size is found in a resource 160, it is highly likely that the slot is for that type of content item. In such implementations, system 108 may initially determine the target content slot based on the size and/or other parameters of the slot, and then verify that the slot is a slot in which the campaign content item 112 was previously served by comparing a current slot signature with stored slot signatures for the resource 160 and campaign content item 112, as described in detail above. In some implementations, system 108 may generate slot signatures for each of the slots in the resource 160 and may determine the target content slot by comparing the slot signatures with stored slot signatures for the campaign content item 112 and resource 160 and identifying any matches, rather than first identifying the content slot without the slot signature and then verifying that the content slot is correct based on the slot signature. The final representative image may be generated by taking a screen capture or otherwise generating an image of the resource 160 after the campaign content item 112 has been swapped into the resource 160. The representative image may be stored in any format, such as an image file format (e.g., JPG, GIF, TIFF, raw image file, etc.).

In some implementations, system 108 may swap textual content campaign items 112, for example, by picking up keywords from a page crawl. In some implementations, a forced content request mechanism may be used that is configured to provide enough information for the system 108 to properly render the snapshot recreation of the textual content. In some implementations, system 108 may be configured to transmit service requests (e.g., via a remote procedure call (RPC)) to a service that renders the textual content campaign items. In some implementations, system 108 may provide support for template-generated content campaign items 112.

Content management system 108 may verify that content items appear correctly in the representative image by comparing the portion of the representative image in which the content campaign item 112 should appear with a stored image of the content campaign item 112 (225). Rendering issues can sometimes occur when attempting to capture a screenshot of the resource including the swapped content item. For example, when attempting to capture a screenshot in an automated manner, robots may block rendering of certain content items that are configured to be rendered only for live, or online, processes/users. This verification may allow system 108 to determine whether the generated campaign snapshot looks presentable, such as ensuring the content campaign item is visible in the snapshot (generated image), ensuring the snapshot was timed correctly, avoiding overlap in content slots, and/or detecting other types of rendering problems. To ensure the correct timing of a snapshot, for example, system 108 may be configured to rely on a loading event to begin parsing the structure (e.g., tree structure) of the resource 160 to search for content items to swap. Further code may be used to delay the snapshot acquisition in order to account for gaps between a content rendering and generation of a snapshot (e.g., delay acquiring the snapshot until after it is confirmed that the desired content item has loaded). In one implementation, system 108 may execute code that is configured to search for and identify explicit signals that a content item was swapped by the injected code.

Figure 4:
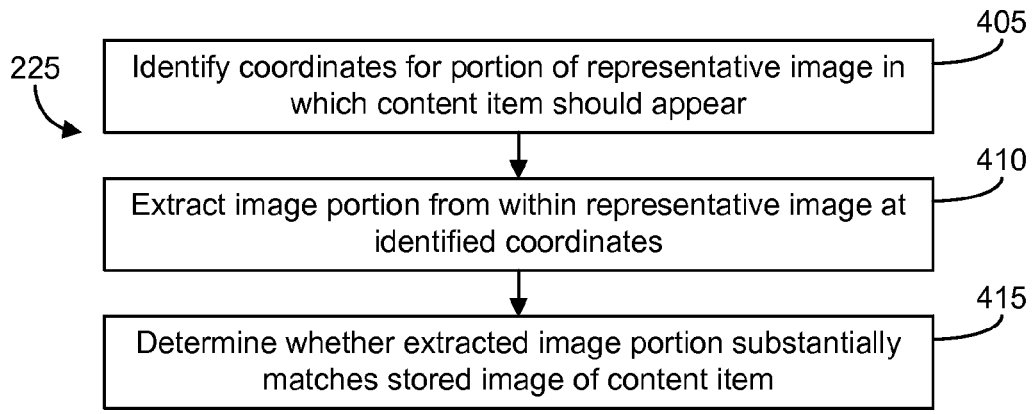
FIG. 4 is a flow diagram of a process for verifying whether an image of a content item has been rendered correctly within a representative image of a resource including the content item according to an illustrative implementation.

FIG. 4 illustrates a process for verifying that the campaign content item 112 has been correctly swapped and is properly rendered in the generated representative image according to an illustrative implementation. Content management system 108 may identify coordinates for portions of the representative image in which content item should appear (405). The coordinates may be contained in a database (e.g., stored after a script initially determines the coordinates of the content slot), or system 108 may be configured to execute code (or cause the code to be executed on a content provider device 106 and/or resource server 150) to determine the coordinates of the representative image. In one implementation, a script (i.e. Javascript) may be configured to determine the coordinates. For example, a Javascript may be used to determine the coordinates by aggregating offsetLeft and offsetTop through elements offsetParent(s).

The content management system 108 may extract image portions from within the generated representative image at the identified coordinates (410). In some implementations, system 108 may be configured to execute an image extraction process that takes as input the representative image and the coordinates within the representative image in which the campaign content item should appear. The image extraction process may return an image portion corresponding to the portion of the representative image at the input coordinates.

The content management system 108 may determine whether the extracted image portion from the representative image substantially matches a stored image of a content campaign item. When the extracted image portion matches the stored image, system 108 may determine that the campaign content item has been rendered correctly within the representative image. When the extracted image portion does not match the stored image, system 108 may determine that the campaign content item was not correctly rendered, and the representative image may be regenerated with the same or different settings. In some implementations, the comparison may be performed on a pixel-by-pixel basis (i.e., comparing a pixel of the extracted image with a corresponding pixel of the stored image). In some implementations, the comparison may be based on any type of image comparison method (e.g., comparing colors, contrast, and/or other characteristics, such as aggregated or averaged characteristics, of the extracted and stored images to determine whether the images are the same or substantially similar. In some implementations, static images and text content items may be compared to detect exact and/or approximate matches. In some implementations, more dynamic formats (i.e. GIF, moving video, etc.) may be analyzed based on the appearance of content or the entropy of pixels as compared against a uniform background, wherein a uniform background may indicate that a content did not render or is invisible to the rendering engine. In some implementations, once the final representative image is generated and/or verified, remaining content slots in the representative image may be replaced with blank images or otherwise modified to focus attention in the snapshot on the target campaign content item.

In some implementations, such as when system 108 generates the representative snapshots offline (e.g., using batch processing of representative content images for content campaigns), system 108 may not be able to obtain a crawled version of a desired resource 160. For example, system 108 may be required to respect robots.txt restrictions for some or all of the resources 160, and the robots.txt restrictions may prohibit crawling of a resource 160. In such an example, the script executed offline by system 108 may not be able to properly detect the current content items in the content slots of the resource 160, and may not be able to swap the content items to generate a representative image. In some implementations, if offline processing does not yield enough successfully rendered snapshots, system 108 may be configured to discontinue offline processing and may provide, or continue providing, online processing and generation of snapshots on request of the content provider. Such online processing may be permitted by robots.txt restrictions, as the content is being provided to a live user rather than an automated, offline process.

Figure 5A:
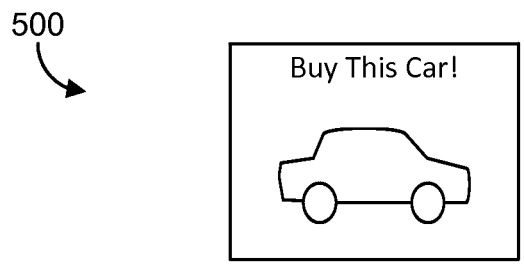
FIG. 5A is an illustration of a content item according to an illustrative implementation.
Figure 5B:
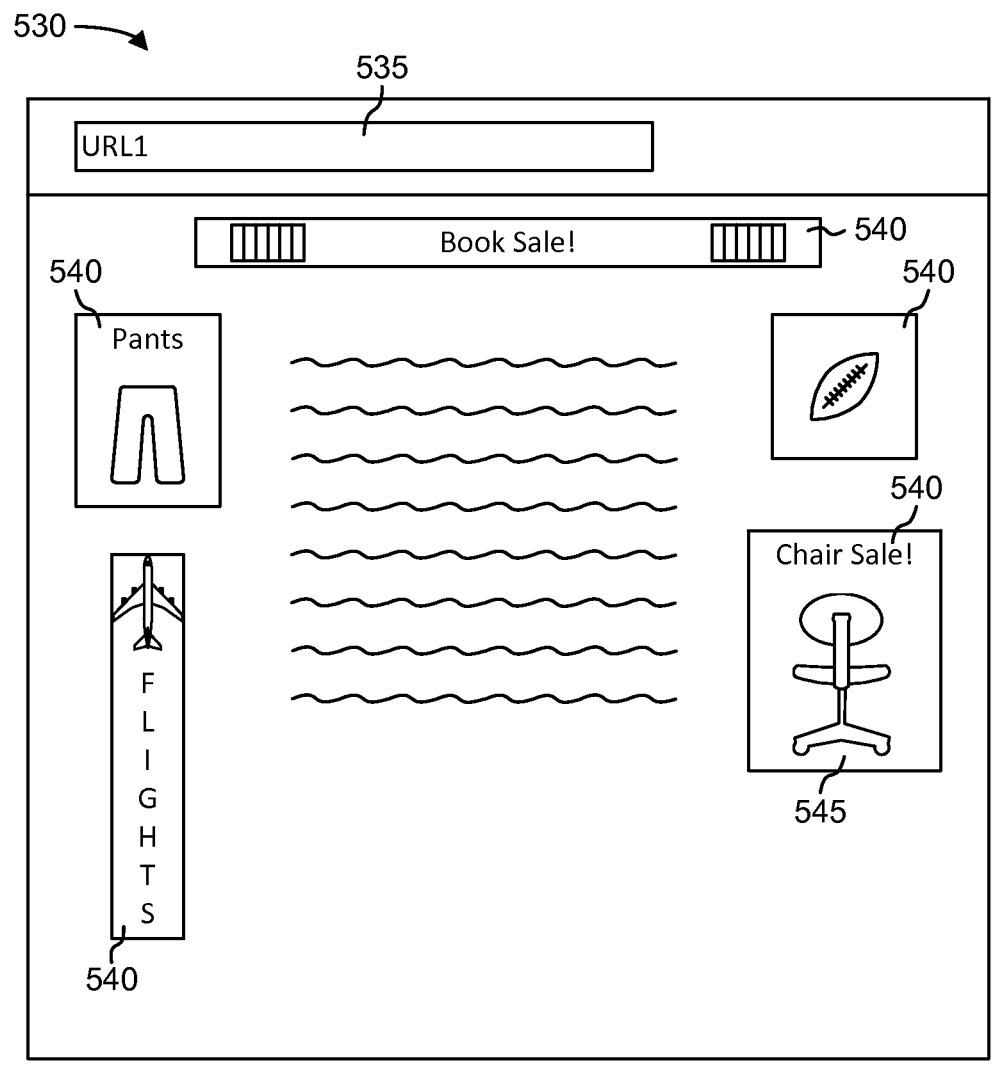
FIG. 5B is an illustration of a current version of a resource in which the content item shown in FIG. 5A previously appeared according to an illustrative implementation.
Figure 5C:
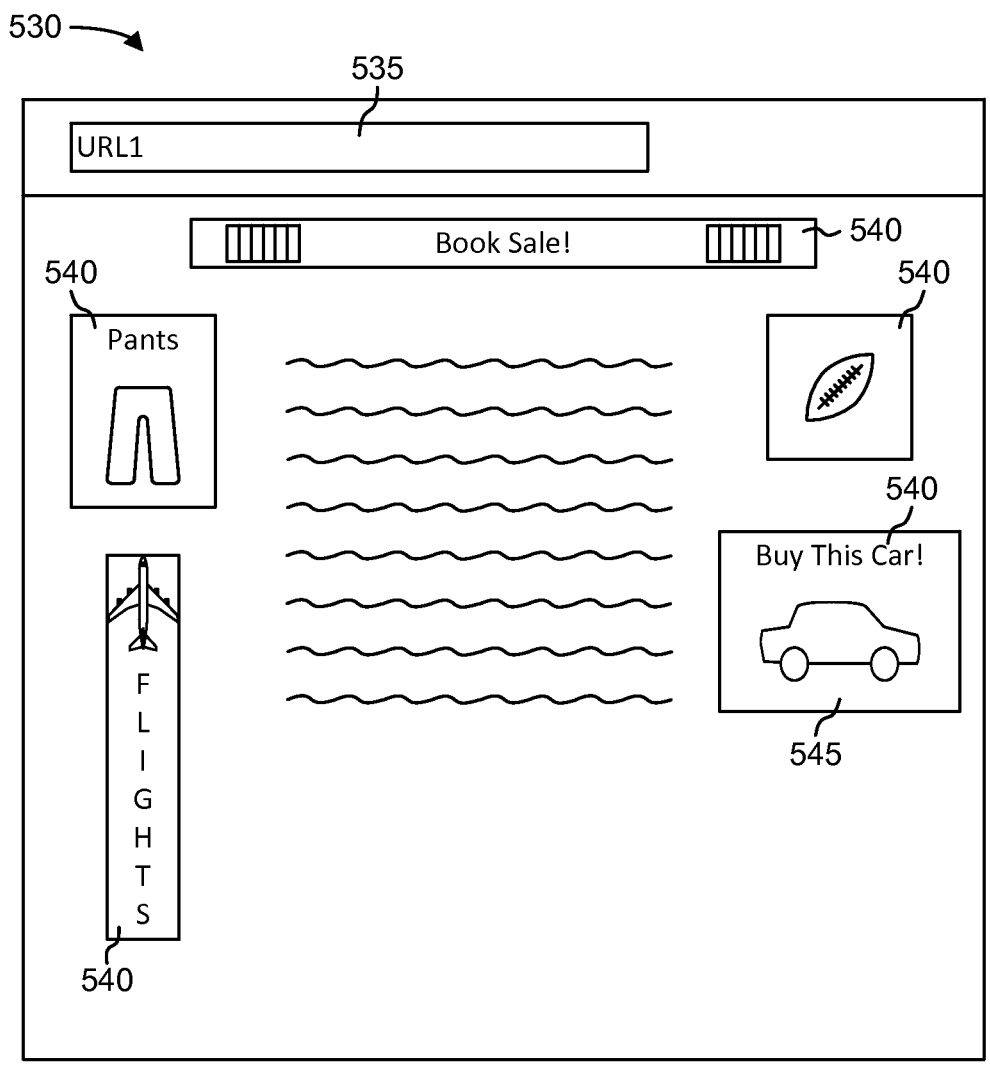
FIG. 5C is an illustration of a generated representative image of the resource shown in FIG. 5B including the content item shown in FIG. 5A according to an illustrative implementation.

Referring now to FIGS. 5A through 5C, a visual illustration of generation of a representative image 560 including a content item 500 is shown according to an illustrative implementation. FIG. 5A illustrates a content item 500 marketing a particular type of car. FIG. 5B illustrates a browser application interface including a webpage 530 retrieved using a URL 535. Webpage 530 includes several content slots 540. A content management system may determine that an impression of content item 500 was previously served in a content slot 545. The system may swap the item currently appearing in slot 545 with an image of content item 500. In some implementations, the system may also blank out the other content slots 540 to draw attention to content item 500 in the final rendered snapshot. FIG. 5C illustrates the final snapshot, representative image 560, which includes content item 500 in content slot 545.

FIG. 6 illustrates a campaign report interface 600 through which a content provider may select one or more content items and/or one or more placement resources for which snapshots should be generated according to an illustrative implementation. In the illustrated implementation, interface 600 lists several placement locations (e.g., URLs) in which impressions of Campaign A have been served. In some implementations, interface 600 may additionally or alternatively list individual content items of Campaign A and/or the locations at which the individual content items have been served. Interface 600 includes selection boxes 605 that may be selected by the content provider to indicate that the content provider wishes for snapshots to be generated for the associated placement locations and/or content items. The content provider may select a submit button 610 to cause the system to generate the selected placement snapshots and/or present the snapshots to the content provider.

Figure 7:
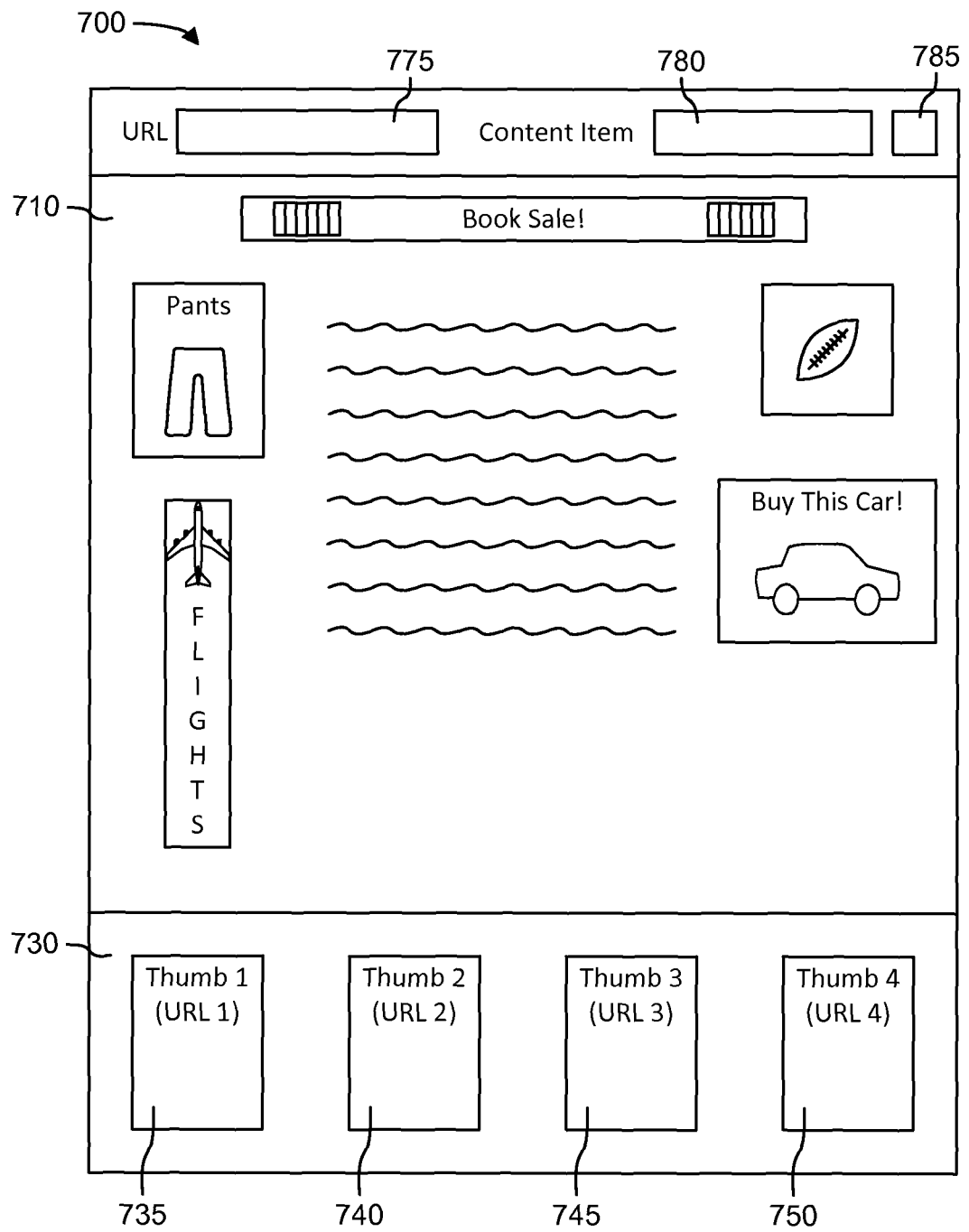
FIG. 7 is an illustration of a user interface presenting representative images for the placements shown in FIG. 6 according to an illustrative implementation.

FIG. 7 illustrates a snapshot interface 700 through which one or more generated representative snapshot images may be presented to the content provider according to an illustrative implementation. Interface 700 includes a snapshot portion 710 in which a currently selected snapshot image is displayed. Interface 700 also includes a snapshot selection portion 730 in which multiple snapshot selection items are provided that can be selected by the content provider to display different snapshots of a content campaign. For example, a first snapshot button 735 may be selected to display a first snapshot for a placement at URL 1 (currently shown in snapshot portion 710 in FIG. 7), a second snapshot button 740 may be selected to display a second snapshot for a placement at URL 2, a third snapshot button 745 may be selected to display a third snapshot for a placement at URL 3, and a fourth snapshot button 750 may be selected to display a fourth snapshot for a placement at URL 4. In the illustrated implementation, buttons 735-750 are selectable thumbnail images of some or all of the actual snapshots. The content provider may hover an input marker (e.g., mouse symbol) over the thumbnail to view additional thumbnails of available snapshots. In other implementations, buttons 735-750 do not necessarily include images of the actual snapshots (e.g., may include textual descriptions). In some implementations, interface 700 may include a manual selection portion 770 that may allow a content provider to manually provide a particular URL 775 and/or content item 780 and generate a desired snapshot representation of the content item 780 within the URL 775 by selecting a get snapshot button 785.

Figure 8:
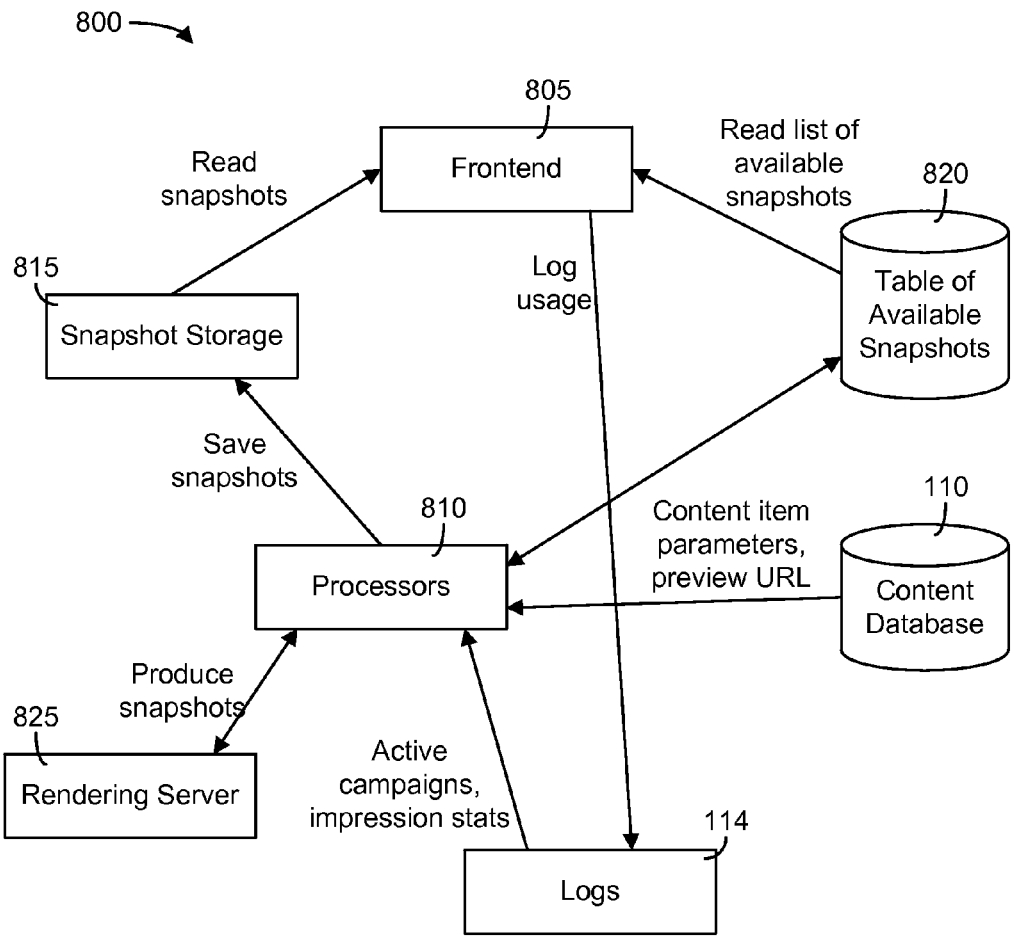
FIG. 8 is a data flow diagram of a system for generating representative images of content items according to an illustrative implementation.

FIG. 8 is a data flow diagram for a system 800 for generating representative images of content items according to an illustrative implementation. System 800 may be one illustrative implementation of features of content management system 108 configured to generate representative snapshot images. System 800 may be configured to generate representative images using an offline process. For example, snapshot requests may be triggered by a nightly logs processing procedure. In some implementations, system 800 may additionally or alternatively be used to process representative images in an online (e.g., on-demand) environment, such as in response to requests from a content provider.

A frontend module 805 may be configured to receive requests for the generation of snapshot images from content provider devices, other external devices, and/or other components of system 800. In some implementations, frontend module 805 may provide a user interface (e.g., a GUI) to a content provider device, and the content provider may provide input using the user interface. Based on the input, frontend module 805 may generate one or more commands to be transmitted to a log processing module. In some implementations (e.g., some implementations in which snapshots are automatically generated for active campaigns), frontend module 805 may receive requests from other computing components without providing a user interface. For example, frontend module 805 may receive a request to generate sample snapshot images for active campaigns as part of a nightly log processing operation. A log processing module may receive the requests and identify relevant log usage data for a particular time period (e.g., day, day part, etc.) and retrieve the usage data from activity logs 114. The usage data may include information pertaining to auction processes that were conducted, winning bids and/or content items that were selected using the auction processes, resources in which impressions of the winning content items were displayed, slot signatures associated with the content item, resource, and/or content slot of the resource in which the content item impression was provided, user device characteristics (e.g., device type) of the user devices on which the impressions were displayed, and/or other types of data.

One or more processors 810 may be configured to retrieve relevant data regarding active campaigns and displayed impressions for the requested snapshots from activity logs 114. In some implementations, processors 810 may be configured to determine a number of impressions served for an active campaign and, if a number of impressions is above a threshold number, cause snapshots to be generated. Processors 810 may retrieve instructions and metadata needed to perform snapshot job requests from a database. Processors 810 may also retrieve a list of available snapshots that have been previously generated from a table 820 of available snapshots. In some implementations, processors 810 will cause new snapshots to be generated if existing snapshots are more than a certain timeframe old. In some implementations, table 820 may be configured to store the instructions and metadata needed to perform job requests as well. Table 820 may be configured to store only metadata (e.g., rather than the snapshots/content items themselves) to allow for fast access times (e.g., allowing for frontend request times of 50-200 ms). Processors 810 may retrieve items needed to generate the snapshot from content database 110, such as content items and/or parameters of the content items (e.g., size parameters), preview URLs (e.g., a URL that fetches a content item without going through the auction process), and/or other items. In some implementations, if the request can be partially or fully fulfilled using previously generated snapshots, as reflected in table 820, processors 810 may utilize the previously generated snapshots rather than generating new snapshots (e.g., if the snapshots were generated recently and/or fulfill requirements of the request, such as a particular requested target resource). In some implementations, the parameters used to determine whether snapshots are generated or not may be tuned to match a backend throughput of system 800. System 800 may be designed to gracefully address processing failures, such that a next processing run may complete any failed requests. In some implementations, table 820 may be replicated (e.g., for each processor 810) to reduce lookup latencies.

Processors 810 may transmit any information needed to generate the snapshots (e.g., resource identifier, desired content item and/or item identifier, slot signature(s), etc.) to a rendering server 825. Rendering server 825 may be configured to retrieve a current copy of the target resource, swap the desired content item into the copy, and verify that the snapshot has rendered correctly, as described in detail above. Rendering server 825 may then return a copy of the generated snapshot to processors 810. Processors 810 may store the generated snapshot in a snapshot storage service 815, and the stored snapshot may be later retrieved from snapshot storage service 815 by frontend module 805 to be provided to the content provider. Service 815 may be configured to provide reliable serving of images with low latencies, and may provide automated scaling and/or cropping of images. This may assist frontend module 805 in adapting the snapshots to different content provider device screen sizes/resolutions. In some implementations, service 815 may provide a zoomed in preview of the content item as well as full page screenshots.

Figure 9:
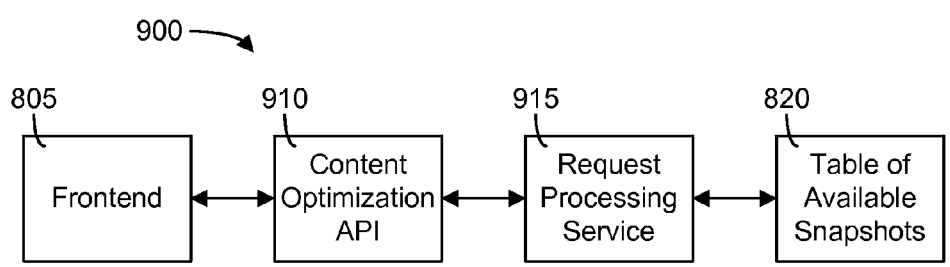
FIG. 9 is a data flow diagram of a frontend data flow for generating representative images of content items according to an illustrative implementation.

FIG. 9 is a data flow diagram of a frontend data flow 900 for generating representative images of content items according to an illustrative implementation. Requests may be received at frontend module 805. The requests may be transmitted to a content optimization API 910 configured to process requests received through one or more frontends of the content management system. Content optimization API 910 may be configured to receive requests, determine one or more system components that are configured to address the requests, and transmit the requests to the relevant components to coordinate fulfillment of the requests. In some implementations, content optimization API 910 may provide some caching for requests. Content optimization API 910 may transmit snapshot requests to a snapshot request processing service 915 that provides API commands for fetching a list of available snapshots from table 820. If the desired snapshot already exists, service 915 may provide an indicator of and/or link to the snapshot, for example, in snapshot storage service 815. If the desired snapshot does not exist, service 915 may transmit a request for creation of the snapshot to one or more other components, such as processors 810 of system 800.

Figure 10:
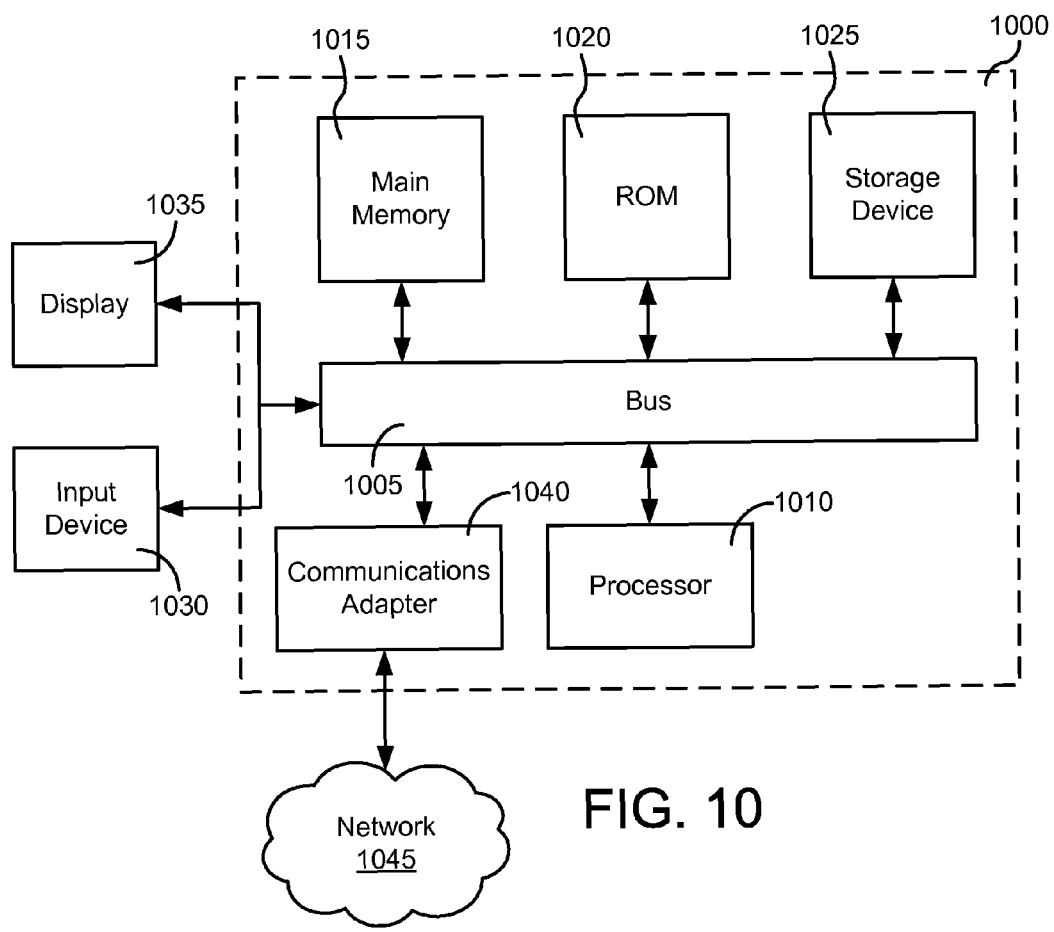
FIG. 10 is a block diagram of a computing system according to an illustrative implementation.

FIG. 10 illustrates a depiction of a computer system 1000 that can be used, for example, to implement an illustrative user device 104, an illustrative content management system 108, an illustrative content provider device 106, and/or various other illustrative systems described in the present disclosure. The computing system 1000 includes a bus 1005 or other communication component for communicating information and a processor 1010 coupled to the bus 1005 for processing information. The computing system 1000 also includes main memory 1015, such as a random access memory (RAM) or other dynamic storage device, coupled to the bus 1005 for storing information, and instructions to be executed by the processor 1010. Main memory 1015 can also be used for storing position information, temporary variables, or other intermediate information during execution of instructions by the processor 1010. The computing system 1000 may further include a read only memory (ROM) 1010 or other static storage device coupled to the bus 1005 for storing static information and instructions for the processor 1010. A storage device 1025, such as a solid state device, magnetic disk or optical disk, is coupled to the bus 1005 for persistently storing information and instructions.

The computing system 1000 may be coupled via the bus 1005 to a display 1035, such as a liquid crystal display, or active matrix display, for displaying information to a user. An input device 1030, such as a keyboard including alphanumeric and other keys, may be coupled to the bus 1005 for communicating information, and command selections to the processor 1010. In another implementation, the input device 1030 has a touch screen display 1035. The input device 1030 can include a cursor control, such as a mouse, a trackball, or cursor direction keys, for communicating direction information and command selections to the processor 1010 and for controlling cursor movement on the display 1035.

In some implementations, the computing system 1000 may include a communications adapter 1040, such as a networking adapter. Communications adapter 1040 may be coupled to bus 1005 and may be configured to enable communications with a computing or communications network 1045 and/or other computing systems. In various illustrative implementations, any type of networking configuration may be achieved using communications adapter 1040, such as wired (e.g., via Ethernet), wireless (e.g., via WiFi, Bluetooth, etc.), pre-configured, ad-hoc, LAN, WAN, etc.

According to various implementations, the processes that effectuate illustrative implementations that are described herein can be achieved by the computing system 1000 in response to the processor 1010 executing an arrangement of instructions contained in main memory 1015. Such instructions can be read into main memory 1015 from another computer-readable medium, such as the storage device 1025. Execution of the arrangement of instructions contained in main memory 1015 causes the computing system 1000 to perform the illustrative processes described herein. One or more processors in a multi-processing arrangement may also be employed to execute the instructions contained in main memory 1015. In alternative implementations, hard-wired circuitry may be used in place of or in combination with software instructions to implement illustrative implementations. Thus, implementations are not limited to any specific combination of hardware circuitry and software.

Although an example processing system has been described in FIG. 10, implementations of the subject matter and the functional operations described in this specification can be carried out using other types of digital electronic circuitry, or in computer software, firmware, or hardware, including the structures disclosed in this specification and their structural equivalents, or in combinations of one or more of them.

Implementations of the subject matter and the operations described in this specification can be carried out using digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be implemented as operations performed by a data processing apparatus on data stored on one or more computer-readable storage devices or received from other sources.

The term "data processing apparatus" or "computing device" encompasses all kinds of apparatus, devices, and machines for processing data, including by way of example, a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be carried out using a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be carried out using a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

In some illustrative implementations, the features disclosed herein may be implemented on a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be carried out in combination or in a single implementation. Conversely, various features that are described in the context of a single implementation can also be carried out in multiple implementations, separately, or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination. Additionally, features described with respect to particular headings may be utilized with respect to and/or in combination with illustrative implementations described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products embodied on tangible media.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:

identifying, at a computerized content management system, a resource in which a content campaign item has been previously displayed on behalf of a content provider;

identifying a slot signature specific to the previous display of the content campaign item in the resource;

determining, using the content management system, a content slot within the resource in which the content campaign item was previously displayed, wherein the content slot is determined based on the slot signature associated with the content slot;

retrieving, using the content management system, a current version of the resource, wherein the current version of the resource includes a current content item appearing in the content slot;

generating a representative image of the resource that includes the content campaign item by replacing, using the content management system, the current content item appearing in the content slot within the current version of the resource with the content campaign item; and providing the generated representative image to the content provider.

2. The method of claim 1, wherein the resource comprises a webpage.

3. The method of claim 1, wherein determining the content slot in which the content campaign item was previously displayed comprises:

identifying one or more candidate content slots within the resource; and verifying the content slot in which the content campaign item previously appeared from among the one or more candidate content slots using the slot signature.

4. The method of claim 3, wherein identifying the one or more candidate content slots within the resource comprises at least one of:

matching one or more code elements for the one or more candidate content slots within code associated with the resource to an element known to be associated with a content management network; and matching a size of the one or more candidate content slots within the resource to a size known to be associated with slots designated for content items.

5. The method of claim 3, wherein verifying the content slot using the slot signature comprises:

retrieving one or more stored slot signatures associated with one or more previous impressions of the content campaign item displayed within the resource;

comparing the one or more stored slot signatures with a current slot signature for the content slot within the current version of the resource; and verifying that the content slot is the content slot in which the content campaign item previously appeared when the current slot signature matches at least one of the one or more stored slot signatures.

6. The method of claim 3, wherein the identified slot signature is generated based on at least one characteristic of the content slot and at least one characteristic relating to a location of the content slot within the resource.

7. The method of claim 6, wherein the identified slot signature comprises a hashtag generated based in part on an identifier associated with the content slot.

8. The method of claim 1, further comprising verifying that the content campaign item appears correctly within the representative image by comparing a portion of the representative image in which the content campaign item should appear with a stored image of the content campaign item.

9. The method of claim 8, wherein comparing the portion of the representative image in which the content campaign item should appear with the stored image of the content campaign item comprises:

identifying coordinates for the portion of the representative image in which the content campaign item should appear;

extracting an image portion from within the representative image at the identified coordinates; and determining whether the extracted image portion matches at least a portion of the stored image of the content campaign item.

10. A system comprising:

at least one computing device operably coupled to at least one memory and configured to:

identify a resource in which a content campaign item has been previously displayed on a user device on behalf of a content provider;

identify a slot signature specific to the previous display of the content campaign item in the resource;

determine a content slot within the resource in which the content campaign item was previously displayed, wherein the content slot is determined based on the slot signature associated with the content slot;

retrieve a current version of the resource, wherein the current version of the resource includes a current content item appearing in the content slot;

generate a representative image of the resource that includes the content campaign item by replacing the current content item appearing in the content slot within the current version of the resource with the content campaign item; and provide the generated representative image to the content provider.

11. The system of claim 10, wherein the at least one computing device is configured to determine the content slot in which the content campaign item was previously displayed by:

identifying one or more candidate content slots within the resource; and verifying the content slot in which the content campaign item previously appeared from among the one or more candidate content slots using the slot signature.

12. The system of claim 11, wherein the at least one computing device is configured to identify the one or more candidate content slots within the resource by performing at least one of:

matching one or more code elements for the one or more candidate content slots within code associated with the resource to an element known to be associated with a content management network; and matching a size of the one or more candidate content slots within the resource to a size known to be associated with slots designated for content items.

13. The system of claim 11, wherein the at least one computing device is configured to verify the content slot using the slot signature by:

retrieving one or more stored slot signatures associated with one or more previous impressions of the content campaign item displayed within the resource;

comparing the one or more stored slot signatures with a current slot signature for the content slot within the current version of the resource; and verifying that the content slot is the content slot in which the content campaign item previously appeared when the current slot signature matches at least one of the one or more stored slot signatures.

14. The system of claim 11, wherein the identified slot signature is generated based on at least one characteristic of the content slot and at least one characteristic relating to a location of the content slot within the resource.

15. The system of claim 14, wherein the identified slot signature comprises a hashtag generated based in part on an identifier associated with the content slot.

16. The system of claim 10, further comprising verifying that the content campaign item appears correctly within the representative image by comparing a portion of the representative image in which the content campaign item should appear with a stored image of the content campaign item.

17. One or more computer-readable storage media having instructions stored thereon that, when executed by at least one processor, cause the at least one processor to perform operations comprising:

identifying a resource in which a content campaign item has been previously displayed on behalf of a content provider;

identifying a slot signature specific to the previous display of the content campaign item in the resource;

identifying one or more candidate content slots within the resource;

determining a content slot in which the content campaign item previously appeared from among the one or more candidate content slots based on the slot signature, wherein the slot signature is based on at least one characteristic of the content slot and at least one characteristic relating to a location of the content slot within the resource;

retrieving a current version of the resource, wherein the current version of the resource includes a current content item appearing in the content slot;

generating a representative image of the resource that includes the content campaign item by replacing, using the content management system, the current content item appearing in the content slot within the current version of the resource with the content campaign item;

verifying that the content campaign item appears correctly within the representative image by comparing a portion of the representative image in which the content campaign item should appear with a stored image of the content campaign item; and providing the generated representative image to the content provider.

18. The one or more computer-readable storage media of claim 17, wherein identifying the one or more candidate content slots within the resource comprises at least one of:

matching one or more code elements for the one or more candidate content slots within code associated with the resource to an element known to be associated with a content management network; and matching a size of the one or more candidate content slots within the resource to a size known to be associated with slots designated for content items.

19. The one or more computer-readable storage media of claim 17, wherein determining the content slot based on the identified slot signature comprises:

retrieving one or more stored slot signatures associated with one or more previous impressions of the content campaign item displayed within the resource;

comparing the one or more stored slot signatures with a current slot signature for the content slot within the current version of the resource; and verifying that the content slot is the content slot in which the content campaign item previously appeared when the current slot signature matches at least one of the one or more stored slot signatures.

20. The one or more computer-readable storage media of claim 17, wherein the identified slot signature comprises a hashtag generated based in part on an identifier associated with the content slot.

* * * * *